United States Patent

[11] 3,627,077

| [72] | Inventor | Otto Grupe<br>Gross-Gerau, Germany |
|---|---|---|
| [21] | Appl. No. | 21,110 |
| [22] | Filed | Mar. 19, 1970 |
| [45] | Patented | Dec. 14, 1971 |
| [73] | Assignee | General Motors Corporation<br>Detroit, Mich. |
| [32] | Priority | Mar. 27, 1969 |
| [33] | | Germany |
| [31] | | P 19 15 605.9 |

[54] MOTOR VEHICLE CHANGE-SPEED GEAR LUBRICATION ARRANGEMENTS
12 Claims, 3 Drawing Figs.

| [52] | U.S. Cl. | 184/6.12, 184/11 A |
|---|---|---|
| [51] | Int. Cl. | F01m 9/06 |
| [50] | Field of Search | 74/467; 184/6 U, 11 R, 11 A, 11 B, 13 R |

[56] References Cited
UNITED STATES PATENTS

| 2,247,732 | 7/1941 | Paton | 184/6 U |
|---|---|---|---|
| 2,633,208 | 3/1953 | Randt | 184/13 |
| 2,487,350 | 11/1949 | Markland | 184/11 |
| 3,138,222 | 6/1964 | Dames et al. | 184/11 A |
| 3,195,682 | 7/1965 | Reneerkans | 184/6 UX |

*Primary Examiner*—Manuel A. Antonakas
*Attorneys*—W. E. Finken and A. M. Heiter ABSTRACT: An annular flange portion rotatable with a shaft spaces apart two rotary gears mounted on bearing surfaces on the shaft. The flange has at least one peripheral slot whose sidewalls direct lubricant impinging thereon to the bearing surfaces.

Inventor
Otto Grupe
BY
*a.m. neiter*
Attorney

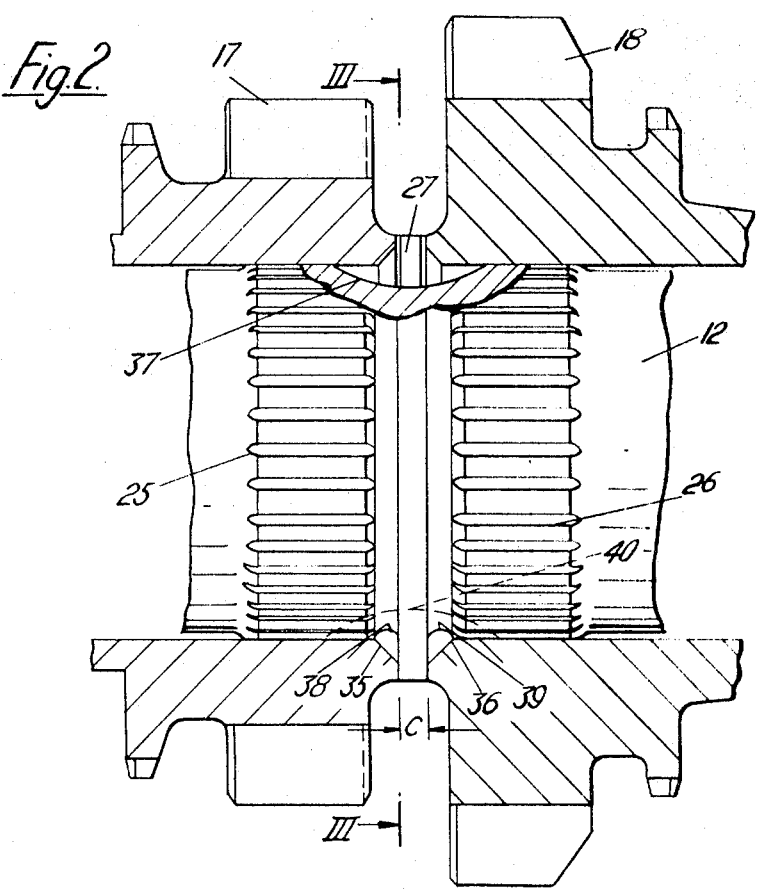
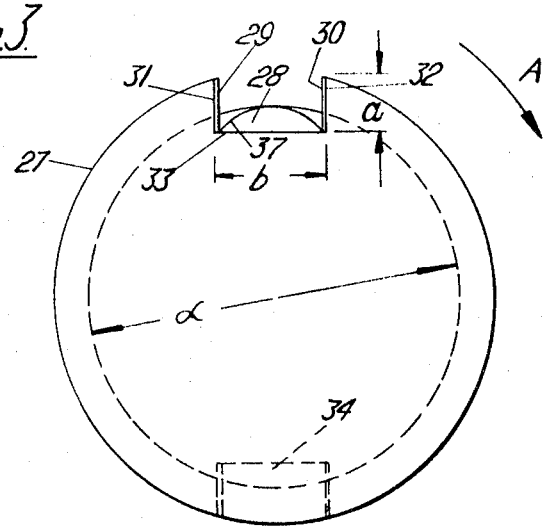

MOTOR VEHICLE CHANGE-SPEED GEAR LUBRICATION ARRANGEMENTS

This invention relates to motor vehicle change-speed gear lubricant arrangements.

The problem of adequately lubricating the bearing surfaces which carry rotary gears of a motor vehicle change-speed gearbox becomes increasingly difficult as engine speeds rise.

By the present invention there is provided a motor vehicle change-speed gearbox having adequate lubrication of the bearing surfaces for one or more rapidly revolving gears, which lubrication is achieved by only comparatively minor modification of the gearbox, and the modifications can be done economically in production.

In the drawing:

FIG. 2 is an enlarged view of the portion of the gearbox ringed in FIG. 1; and

FIG. 3 is a section on the line III-III of FIG. 2, viewed in the direction of the arrows.

Figure 1:
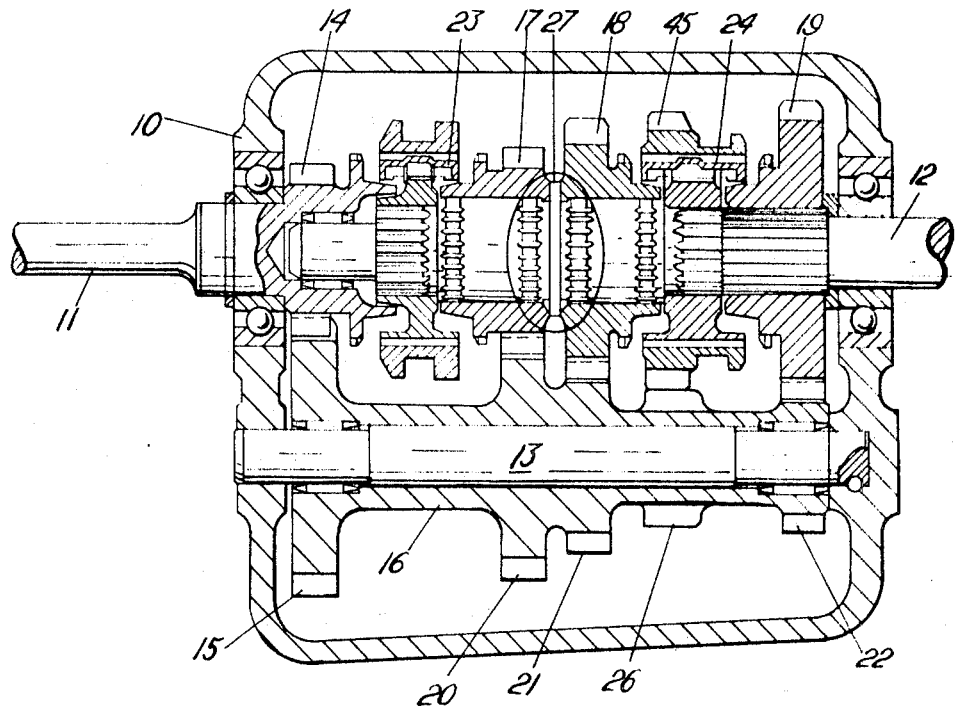
FIG. 1 is a longitudinal section through a motor vehicle change-speed gearbox according to the invention.

FIG. 1 shows a longitudinal section through a motor vehicle constant mesh gearbox having a housing 10, input means 11 in the form of a rotary drive shaft arranged to be connected to an engine (not shown) of a motor vehicle (also not shown). The rotary drive shaft 11 is formed with an integral pinion 14 which is constantly in mesh with a gear 15 rotatably carried on a hollow countershaft 16 rotatably mounted on a spindle 13 secured in the housing 10. The main shaft 12 carries axially fixed rotary gears 17, 18, 19 which are arranged for constant meshing engagement with respective ones of rotary gears 20, 21, 22 carried on the countershaft 16. The main shaft 12 also carries synchronizer devices 23, 24 to positively connect respective ones of the rotary gears 19, 18, 17 with the main shaft 12 during speed changes from first to third gear ratios. Fourth speed is engaged by direct coupling of the drive shaft 11 to the main shaft 12. The gearbox also has a reverse gear spindle (not shown). The synchronizer device 24 carries teeth 45 which upon engagement of reverse gear are connected with gear 26 on the countershaft 16 by the interposition of a reverse pinion (not shown).

To facilitate the mounting of the rotary gears 17, 18, 19 the main shaft 12 has grooves or splines formed in it constituting a plurality of circumferentially spaced, axially extending bearing surfaces on the shaft. The third speed gear 17 is shown rotatably mounted on grooves or splines 25, and the second speed gear 18 is shown rotatably mounted on grooves or splines 26. These bearing surfaces, exemplified by reference numerals 25 and 26, are formed on the shaft to provide a reduced contact surface between the shaft and the rotary gears mounted thereon, and to permit the maintenance of a substantially constant oil film in the clearance between the shaft and the rotary gears.

The main shaft 12 has an annular flange portion or collar 27 formed thereon and the second and third speed rotary gears 18, 17 are mounted on respective axial sides of this flange 27 on the respective bearing surfaces, 26, 25. The flange 27 could be formed in suitable cases as a ring secured on the main shaft.

As best seen in FIG. 3 the flange 27 has two diametrically opposed like through slots 28 and 34 (shown in dotted outline), and since they are alike one only will be described in detail. The through slot 28 has a base portion 33 which extends normally to, and interconnects a pair of sidewalls 29, 30 extending between the periphery of the flange and the base portion 33. These sidewalls are disposed parallel to and on opposite sides of a diameter of the flange 27 at the center of the slot. This rectangular slot is also described above as having sidewalls parallel to a flange diameter at the center of the slot, so each sidewall is inclined in the direction of rotation with respect to a diameter through its lower end so on impact with the sidewall lubricant is thrown more accurately axially. The sidewalls 29, 30 have chamfered radial edges 31, 32, so as to avoid sharp edges, as is common practice in gear construction.

As best seen in FIG. 2, the rotary gears 17, 18 each have a through bore effective to mount the respective rotary gear on the main shaft 12. These bores have chamfered circumferential end portions 35, and 36.

The main shaft 12 has two diametrically opposed longitudinal grooves 37 and 40 each of which extends on both sides of one of the through slots 28 and 34 respectively, forming in effect an axial continuation of the slot into which it merges.

The spacings on the mainshaft 12 between each axial side of the flange 27 and the beginning of the grooves or splines 25 and 26 form two annular grooves 38 and 39. As shown in FIG. 2 the longitudinal grooves 37 and 40 are deeper than the annular grooves 38 and 39 and at their deepest have a greater depth than the grooves or splines 25 and 26.

In operation the sidewalls 29 and 30 of the through slot 28 act as impingement surfaces upon which lubricant thrown up in the gearbox housing 10 can impact and this lubricant is directed by the sidewalls through the channels 37 and 40 and 38 and 39 to the grooves or splines 25 and 26 constituting the bearing surfaces on the main shaft 12. Upon rotation of the main shaft 12 and flange 27 in the direction of the arrow A in FIG. 3 (for forward speeds) lubricant thrown up in the housing 10 would impact the sidewall 29. In reverse, the direction of rotation of the shaft 12 and flange 27 is also reversed, and lubricant then impacts the sidewall 30. The lubricant falls towards the slot 28 in the form of droplets, and after impacting one or other of the sidewalls 29, 30, the droplets should, in theory, follow a curved path relative to the slot. However, tests have shown, that in general only those droplets which pass from the sidewall direct to the slot base wall 33 contribute to the lubrication of the bearing surfaces on the main shaft. The remaining droplets are hurled out of the slot by the rapid rotation of the flange 27. The dimensions of the slot are critical for the lubrication of the bearing surfaces. The depth $a$ of the slot must be such that the base wall 33 lies on or within the radius of the main shaft so as to allow a simple delivery of lubricant to the bearing surfaces, and the depth of the slot also determines the effective area of the impingement surfaces or sidewalls of the slot. The width $b$ of the slot must be at least twice the depth in order to allow the optimum amount of lubricant which impacts the impingement surfaces 29 and 30 to reach the base wall 33 of the slot. It is also important that the slot be substantially rectangular in plan, with substantially planar impingement surfaces at right angles to the slot base wall 33, for most effective use of the impingement surfaces, and also for ease of production of the slot. The width $c$ of the flange is determined by the strength requirement of the flange.

Lubricant which impacts the sidewall 29 or 30, depending on the rotary sense of the flange, and which falls to the slot base 33 is guided by the chamfered edges 31, 32 of the sidewalls, 29, 30 under the chamfered edges 35, 36 of the through bores of the gears 17, 18 into the longitudinal groove 37 and thence to the grooves or splines of the bearing surfaces. Lubricant also enters the annular grooves 38 and 39 from which it can disperse towards the bearing surfaces. The through slot 34 and the groove 40 function in like manner.

The above-described arrangement provides adequate lubrication of the bearing surfaces for the rotary gears 17, 18 even at high speeds of rotation. Tests have shown that with fourth speed engaged, or in neutral (with the main shaft held fixed) in which the greatest relative revolutions per minute occur the gearbox bearing surfaces for the second and third speed gears have been completely and thoroughly lubricated.

The flange 27 has been found to be adequately strong to withstand axial impulses imparted to it by contact with the rotary gears 17, 18 and also to have a second through slot 34 formed in it.

I claim:

1. A motor vehicle change-speed gearbox comprising; a housing; rotary input means; rotary output means; a rotary shaft mounted in said housing; a plurality of circumferentially spaced axially extending bearing surfaces on said shaft; two axially spaced gears rotatably mounted on said bearing surfaces; gear means for transmitting rotary drive from said input means to said rotary gears; an annular flange portion rotatable with said shaft and effective to space said gears axially apart;
at least one through slot formed in said flange portion and having a base wall portion at a depth not greater than the radius of the adjacent bearing surfaces of said shaft; a pair of sidewalls extending between the periphery of said flange portion and said base wall portion, being disposed parallel to and on opposite sides of a diameter of said flange portion; at least one channel in said shaft leading axially from said slot to said bearing surfaces; said sidewalls having a surface acting as impingement surfaces for impact of lubricant thrown up in said housing in an axial direction from said sidewalls through said channel to said bearing surfaces.

2. A motor vehicle change-speed gearbox comprising:
a housing;
rotary input means;
rotary output means;
a rotary shaft mounted in said housing;
a plurality of circumferentially spaced axially extending bearing surfaces on said shaft;
two axially spaced gears rotatably mounted on said bearing surfaces;
gear means for transmitting rotary drive from said input means to said rotary gears;
an annular flange portion rotatable with said shaft and effective to space said gears axially apart;
at least one through slot formed in said flange portion and having a base portion at a depth not greater than the radius of said shaft;
a pair of sidewalls, extending between the periphery of said flange portion and said base portion and being disposed parallel to and on opposite sides of a diameter of said flange portion;
said slot having a width of at least twice its depth;
at least one channel in said shaft leading from said slot to said bearing surfaces;
said sidewalls acting as impingement surfaces for impact of lubricant thrown up in said housing, whereby said lubricant is directed from said sidewalls through said channel to said bearing surfaces.

3. A motor vehicle change-speed gearbox comprising:
a housing;
rotary input means;
rotary output means;
a rotary shaft mounted in said housing;
a plurality of circumferentially spaced axially extending bearing surfaces on said shaft;
two axially spaced gears rotatably mounted on said bearing surfaces;
gear means for transmitting rotary drive from said input means to said rotary gears;
an annular flange portion rotatable with said shaft and effective to space said gears axially apart;
two through slots formed in said flange portion and each having a base portion at a depth not greater than the radius of said shaft;
each slot having a pair of sidewalls extending between the periphery of said flange portion and said base portion and being disposed parallel to and on opposite sides of a diameter of said flange portion;
at least two channels in said shaft leading from said slots to said bearing surfaces;
said sidewalls acting as impingement surfaces for impact of lubricant thrown up in said housing, whereby said lubricant is directed from said walls through said channels to said bearing surfaces.

4. A motor vehicle change-speed gearbox comprising:
a housing;
rotary input means;
rotary output means;
a rotary shaft mounted in said housing;
splines provided on external surface portions of said shaft;
two axially spaced rotary gears each having a through bore effective to mount said gear on said splines;
gear means for transmitting rotary drive from said input means to said rotary gears;
an annular flange portion rotatable with said shaft and effective to space said gears axially apart;
two through slots formed in said flange portion and each having a base portion at a depth not greater than the radius of said shaft;
each slot having a pair of sidewalls extending between the periphery of said flange portion and said base portion and being disposed parallel to and on opposite sides of a diameter of said flange portion;
at least two channels in said shaft leading from said slots to said splines;
said sidewalls acting as impingement surfaces for impact of lubricant thrown up in said housing, whereby said lubricant is directed from said sidewalls through said channels to said splines.

5. A motor vehicle change-speed gearbox comprising:
a housing;
rotary input means;
rotary output means;
a rotary shaft mounted in said housing;
splines provided on external surface portions of said shaft;
two axially spaced rotary gears each having a through bore effective to mount said rotary gear on said splines;
gear means for transmitting rotary drive from said input means to said rotary gears;
an annular flange portion rotatable with said shaft and effective to space said gears axially apart;
two through slots formed in said flange portion and each having a base portion at a depth not greater than the radius of said shaft;
each slot having a pair of substantially planar sidewalls, extending between the periphery of said flange portion and said base portion, and being disposed parallel to and on opposite sides of a diameter of said flange portion and normal to said base portion;
at least two channels in said shaft leading from said slots to said splines;
said sidewalls acting as impingement surfaces for impact of lubricant thrown up in said housing, whereby said lubricant is directed from said sidewalls through said channels to said splines.

6. A motor vehicle change-speed gearbox comprising:
a housing;
rotary input means;
rotary output means;
a rotary shaft mounted in said housing;
splines provided on external surface portions of said shaft;
two axially spaced rotary gears each having a through bore effective to mount said gear on said splines;
gear means for transmitting rotary drive from said input means to said rotary gears;
an annular flange portion rotatable with said shaft and effective to space said gear axially apart;
two through slots formed in said flange portion each slot having a base portion at a depth not less than the depth of the roots of said splines;
each slot having a pair of sidewalls extending between the periphery of said flange portion and said base portion and disposed parallel to and on opposite sides of a diameter of said flange portion;
at least two channels in said shaft leading from said slots to said splines;
said sidewalls acting as impingement surfaces for impact of lubricant thrown up in said housing, whereby said lubricant is directed from said sidewalls through said channels to said splines.

7. A motor vehicle change-speed gearbox comprising:
a housing;
rotary input means;
rotary output means;
a rotary shaft mounted in said housing;
splines provided on external surface portions of said shaft;

two axially spaced rotary gears each having a through bore effective to mount said gear on said shaft, and each bore having chamfered circumferential end portions;

gear means for transmitting rotary drive from said input means to said rotary gears;

an annular flange portion rotatable with said shaft and effective to space said gears axially apart;

two through slots formed in said flange portion each slot having a base portion at a depth not greater than the radius of said shaft;

each slot having a pair of sidewalls extending between the periphery of said flange portion and said base portion and being disposed parallel to and on opposite sides of a diameter of said flange portion, said sidewalls having chamfered radially extending edges;

said sidewalls acting as impingement surfaces for impact of lubricant thrown up in said housing, whereby said lubricant is directed from said sidewalls through said channel to said splines.

8. A motor vehicle change-speed gearbox comprising:

a housing;

rotary input means;

rotary output means;

a rotary shaft mounted in said housing;

splines provided on external surface portions of said shaft;

two axially spaced rotary gears each having a through bore effective to mount said rotary gears on said splines, each bore having chamfered circumferential end portions;

gear means for transmitting rotary drive from said input means to said rotary gears;

an annular flange portion rotatable with said shaft and effective to space said gears axially apart;

two through slots formed in said flange portions and each having a base portion at a depth not greater than the radius of said shaft;

each slot having a pair of substantially parallel sidewalls, extending between the periphery of said flange portion and said base portion, on opposite sides of a diameter of said flange portion;

at least two grooves in said shaft, each groove extending axially on either side of said flange portion and forming an axial continuation of one of said slots;

said sidewalls acting as impingement surfaces for impact of lubricant thrown up in said housing, whereby said lubricant is directed from said sidewalls through said channels to said splines.

9. A motor vehicle change-speed gearbox comprising:

a housing;

rotary input means;

rotary output means;

a rotary shaft mounted in said housing;

a plurality of circumferentially spaced axially extending bearing surfaces on said shaft;

two axially spaced gears rotatably mounted on said bearing surfaces;

gear means for transmitting rotary drive from said input means to said rotary gears;

an annular flange portion rotatable with said shaft and effective to space said gears axially apart;

a plurality of through slots formed in said flange portion each said slot having a base portion at a depth not greater than the radius of said shaft;

each said slot having a pair of sidewalls, extending between the periphery of said flange portion and said base portion, being disposed parallel to and on opposite sides of a diameter of said flange portion;

channels in said shaft leading from said slots to said bearing surfaces;

said sidewalls acting as impingement surfaces for impact of lubricant thrown up in said housing, whereby said lubricant is directed from said sidewalls through said channels to said bearing surfaces.

10. A gearbox comprising: a housing member; a rotary shaft rotatably mounted in said housing member; a gear member mounted on said shaft, bearing means rotatably mounting one member with respect to said shaft and having internal bearing surface means on said one member and external bearing surface means on said shaft rotatably mounted with respect to each other and with an annular lubrication space therebetween; said shaft having an annular flange rotatable with said shaft closely axially adjacent said bearing means; said shaft and flange having at least one radial slot having a base wall extending tangentially relative to the shaft axis and sidewalls extending radially relative to the shaft axis and said sidewalls extending from said base wall to the perimeter of said flange and being peripherally widely spaced for receiving thrown and falling lubricant during rotation of said shaft in said slot for direct impact on said base and sidewalls; said internal and external bearing surface means having axial lubricant guide passage means therebetween extending axially directly opposite said slot from one edge of said bearing surface means toward the center of said bearing surface means and in open communication with said lubrication space; said base wall and a portion of said sidewalls of said slot being radially within a portion of said guide passage means and said portion of said sidewall having an angular surface receiving thrown and falling lubricant for impact on said angular surface of said portion of said sidewall means and directly deflecting said lubricant axially directly into said axial guide passage means for feeding lubricant to said lubrication space.

11. The invention defined in claim 10 and each of said portions of said sidewalls being inclined in the direction of rotation with respect to a diameter through the lower end of the sidewall.

12. The invention defined in claim 10 and said axial guide passage means including a channel in said shaft extending axially toward the center of said bearing surface means radially within said external bearing surface means on said shaft so centrifugal force assists feeding lubricant to said bearing surface means.

* * * * *